US 9,904,450 B2

(12) United States Patent
Johnston et al.

(10) Patent No.: US 9,904,450 B2
(45) Date of Patent: Feb. 27, 2018

(54) SYSTEM AND METHOD FOR CREATING AND SHARING PLANS THROUGH MULTIMODAL DIALOG

(71) Applicant: AT&T INTELLECTUAL PROPERTY I, L.P., Atlanta, GA (US)

(72) Inventors: Michael J. Johnston, New York, NY (US); Patrick Ehlen, San Francisco, CA (US); Hyuckchul Jung, Basking Ridge, NJ (US); Jay H. Lieske, Jr., Los Angeles, CA (US); Ethan Selfridge, Somerville, NJ (US); Brant J. Vasilieff, Glendale, CA (US); Jay Gordon Wilpon, Warren, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 564 days.

(21) Appl. No.: 14/577,311

(22) Filed: Dec. 19, 2014

(65) Prior Publication Data

US 2016/0179908 A1 Jun. 23, 2016

(51) Int. Cl.
G06F 17/30 (2006.01)
G06F 3/0484 (2013.01)

(52) U.S. Cl.
CPC ...... G06F 3/04847 (2013.01); G06F 17/3087 (2013.01)

(58) Field of Classification Search
CPC ............ G06F 17/3089; G06F 17/3087; G06F 17/30241; G01C 21/00; G06T 17/05
See application file for complete search history.

(56) References Cited

U.S. PATENT DOCUMENTS

| 7,366,668 | B1 | 4/2008 | Franz et al. |
| 7,664,530 | B2 | 2/2010 | Skelton |
| 7,680,324 | B2 | 3/2010 | Boncyk et al. |
| 7,904,114 | B2 | 3/2011 | Skelton |

(Continued)

FOREIGN PATENT DOCUMENTS

CN 203289518 11/2013

OTHER PUBLICATIONS

U.S. Appl. No. 14/092,033 to Amanda Joy Stent et al., filed Nov. 27, 2013.

*Primary Examiner* — Noosha Arjomandi
(74) *Attorney, Agent, or Firm* — Greenblum & Bernstein, P.L.C.

(57) ABSTRACT

Methods, systems, devices, and media for creating a plan through multimodal search inputs are provided. A multimodal virtual assistant receives a first search request which comprises a geographic area. First search results are displayed in response to the first search request being received. The first search results are based on the first search request and correspond to the geographic area. Each of the first search results is associated with a geographic location. The multimodal virtual assistant receives a selection of one of the first search results, and adds the selected one of the first search results to a plan. A second search request is received after the selection, and second search results are displayed in response to the second search request being received. The second search results are based on the second search request and correspond to the geographic location of the selected one of the first search results.

20 Claims, 8 Drawing Sheets

(56) References Cited

U.S. PATENT DOCUMENTS

| | | | |
|---|---|---|---|
| 8,065,387 B2 * | 11/2011 | O'Neil | H04L 29/12009 455/419 |
| 8,223,088 B1 | 7/2012 | Gomez et al. | |
| 8,412,531 B2 | 4/2013 | Sullivan et al. | |
| 8,483,712 B2 | 7/2013 | Hamynen et al. | |
| 8,543,441 B2 | 9/2013 | Siegel | |
| 8,558,759 B1 | 10/2013 | Prada et al. | |
| 8,688,446 B2 | 4/2014 | Yanagihara | |
| 8,738,380 B2 | 5/2014 | Baldwin et al. | |
| 8,750,906 B2 | 6/2014 | Winkler et al. | |
| 8,775,156 B2 | 7/2014 | Lebeau et al. | |
| 8,788,434 B2 | 7/2014 | Makadia et al. | |
| 8,868,590 B1 * | 10/2014 | Donneau-Golencer | G06F 17/303 707/733 |
| 9,183,285 B1 * | 11/2015 | Brown | G06F 17/30705 |
| 9,213,949 B1 * | 12/2015 | Lewis | G06Q 10/02 |
| 9,247,272 B2 * | 1/2016 | Murphy | H04N 21/2187 |
| 9,318,108 B2 * | 4/2016 | Gruber | G10L 15/1815 |
| 9,342,598 B1 * | 5/2016 | Maeng | G06F 17/30693 |
| 9,710,546 B2 * | 7/2017 | Paruchuri | G06F 17/30684 |
| 2003/0218638 A1 | 11/2003 | Goose et al. | |
| 2005/0018822 A1 | 1/2005 | Bruce et al. | |
| 2006/0089160 A1 * | 4/2006 | Othmer | H04M 1/72572 455/457 |
| 2007/0124312 A1 * | 5/2007 | Simpson | H04L 51/00 |
| 2007/0207821 A1 * | 9/2007 | Tran | G06Q 30/0209 455/466 |
| 2010/0030578 A1 * | 2/2010 | Siddique | G06Q 10/0637 705/3 |
| 2010/0211605 A1 | 8/2010 | Ray | |
| 2010/0217646 A1 | 8/2010 | Siegel | |
| 2010/0281435 A1 | 11/2010 | Bangalore et al. | |
| 2011/0093784 A1 * | 4/2011 | Kiraz | G06F 17/30864 715/719 |
| 2011/0138286 A1 | 6/2011 | Kaptelinin et al. | |
| 2011/0165917 A1 | 7/2011 | Taylor | |
| 2011/0202594 A1 * | 8/2011 | Ricci | H04M 3/4931 709/203 |
| 2011/0288942 A1 * | 11/2011 | De Wet | G06Q 30/02 705/14.73 |
| 2012/0022872 A1 * | 1/2012 | Gruber | G06F 17/279 704/270.1 |
| 2012/0117051 A1 | 5/2012 | Liu et al. | |
| 2012/0124039 A1 * | 5/2012 | Sandholm | G06F 17/3087 707/724 |
| 2012/0295639 A1 | 11/2012 | Fitoussi et al. | |
| 2013/0033522 A1 | 2/2013 | Calman et al. | |
| 2013/0166293 A1 | 6/2013 | Melamed et al. | |
| 2013/0185081 A1 * | 7/2013 | Cheyer | G06F 17/3087 704/275 |
| 2013/0198196 A1 * | 8/2013 | Myslinski | G06F 17/30023 707/740 |
| 2013/0215116 A1 * | 8/2013 | Siddique | G06Q 30/0643 345/420 |
| 2013/0219277 A1 | 8/2013 | Wang et al. | |
| 2013/0275138 A1 * | 10/2013 | Gruber | G10L 13/00 704/260 |
| 2013/0275164 A1 * | 10/2013 | Gruber | G10L 17/22 705/5 |
| 2013/0285942 A1 | 10/2013 | Ko | |
| 2013/0311428 A1 * | 11/2013 | Patel | G06F 17/30312 707/634 |
| 2013/0326353 A1 | 12/2013 | Singhal | |
| 2014/0075393 A1 | 3/2014 | Mei et al. | |
| 2014/0115456 A1 | 4/2014 | White et al. | |
| 2014/0160078 A1 | 6/2014 | Seo et al. | |
| 2014/0164525 A1 * | 6/2014 | Malik | H04L 51/32 709/206 |
| 2014/0195252 A1 * | 7/2014 | Gruber | G10L 15/22 704/275 |
| 2014/0279280 A1 * | 9/2014 | Bennett | G06Q 30/0637 705/26.82 |
| 2014/0302877 A1 * | 10/2014 | Johnson | H04W 4/02 455/456.3 |
| 2014/0372420 A1 * | 12/2014 | Slep | G06F 17/3087 707/724 |
| 2015/0058324 A1 * | 2/2015 | Kauwe | G06Q 50/01 707/722 |
| 2015/0178302 A1 * | 6/2015 | Plakhov | G06F 17/30864 707/706 |
| 2015/0261813 A1 * | 9/2015 | Pappula | H04L 12/1813 707/758 |
| 2015/0350266 A1 * | 12/2015 | O'Brien | H04L 65/403 709/204 |
| 2015/0381403 A1 * | 12/2015 | Venaglia | H04W 4/001 709/220 |
| 2016/0125469 A1 * | 5/2016 | Tseng | G06Q 30/0269 705/14.58 |

\* cited by examiner

SYSTEM AND METHOD FOR CREATING AND SHARING PLANS THROUGH MULTIMODAL DIALOG

BACKGROUND

1. Field of the Disclosure

The present disclosure relates to the field of event planning. More particularly, the present disclosure relates to a mobile device which includes a virtual assistant for event planning through an interactive multimodal dialog.

2. Background Information

People today have greater access to electronic devices than ever before, and to an increasing number of applications for execution on the electronic devices. For example, voice search and virtual assistant applications, such as Siri, Google Now, S-Voice, Vlingo, Maluuba, etc., spoken access to information, and services on mobile devices have become commonplace. The voice search and virtual assistant applications enable users to use spoken commands in order to search for businesses, events, movies, etc. In addition, social media applications such as Facebook and event planning sites such as Evite enable users to share personal information including upcoming business activities, events, movies, etc. with their friends.

In this regard, while the accessibility and functionally of electronic devices have improved search capabilities and social interactivity, new and improved methods are desired.

DETAILED DESCRIPTION

The present disclosure provides a multimodal virtual assistant (MVA). The MVA may be an application, method, system, medium, or combination thereof that enables users to plan a day, evening, or other through an interactive multimodal dialog with a mobile device. The MVA may include a cloud-based multimodal language processing infrastructure that can support mobile multimodal interaction. The present disclosure, among others, will highlight incremental recognition, combining multimodal speech and gesture input, contextually-aware language understanding, and the targeted clarification of potentially incorrect segments within speech recognition hypothesis.

The MVA explores the application of multimodal dialog technology in the virtual assistant landscape. Rather than displaying the unfolding dialog as a chat display, the MVA may situate the interaction directly within maps and visual information displays. Users may be free to interact with the maps and visual information displays using combinations of speech and gesture inputs. The interpretation of user commands may be dependent on both map display manipulation and the physical location of the mobile device.

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an," "the," etc. is not to be construed as limiting the element to the singular.

Figure 1:
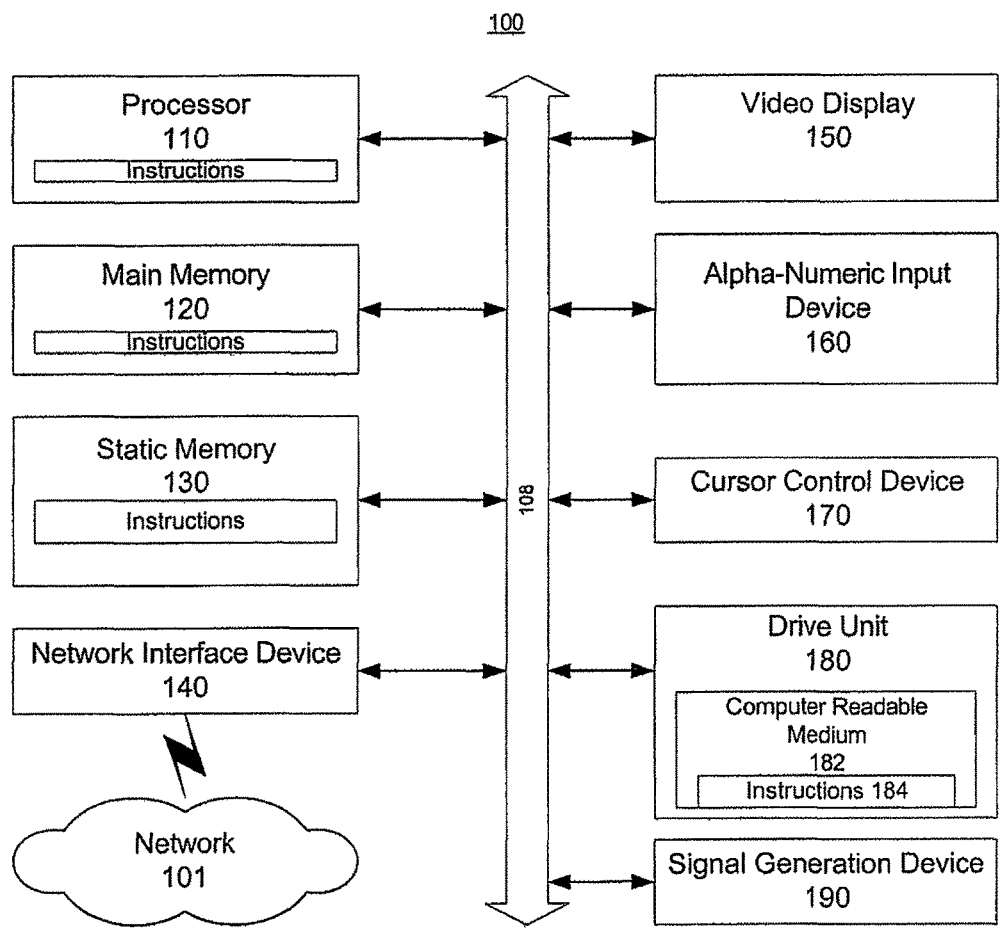
FIG. 1 shows an exemplary general computer system that includes a set of instructions for a virtual assistant for event planning through an interactive multimodal dialog.

FIG. 1 is an illustrative embodiment of a general computer system, on which a system or method for creating and sharing plans through multimodal dialog can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, a client user computer in cloud computing environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a camera, a web appliance, a network router, switch or bridge, or any other machine capable of executing a set of instructions (sequential or otherwise) that specify actions to be taken by that machine. For example, the computer system 100 may be can also be implemented as or incorporate into an automobile or wearable devices, such as, but not limited to, watches, glasses, bracelets, and headsets. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, a cursor control device 170, such as a mouse or touch-sensitive input screen or pad, a microphone, etc. In this regard, the input device 160 may comprise user-controlled inputs. Additionally or alternatively, the input device 160 may comprise automatic or computer controlled inputs such as, but not limited to, lenses, cameras, scanners, sensors, gyroscopes, etc. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Additionally or alternatively to the disk drive unit 180, the computer system 100 may comprise any additional storage unit, such as, but not limited to, a solid state storage or other persistent storage, which comprises the computer-readable medium 182. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

The computer system 100 of FIG. 1, and any components or devices thereof and methods implemented thereby, provides a MVA that enables users to plan a day or evening out with friends through an interactive multimodal dialog. The MVA may be an application or program that is executed by the computer system 100. Alternatively, the MVA may comprise the computer system 100, including the components thereof. The MVA is generally described herein as being an application which is executed by a mobile device, for convenience. Nevertheless, it is to be known and understood that the MVA is not limited to being an application and may additionally or alternatively comprise a computing device.

Figure 2:
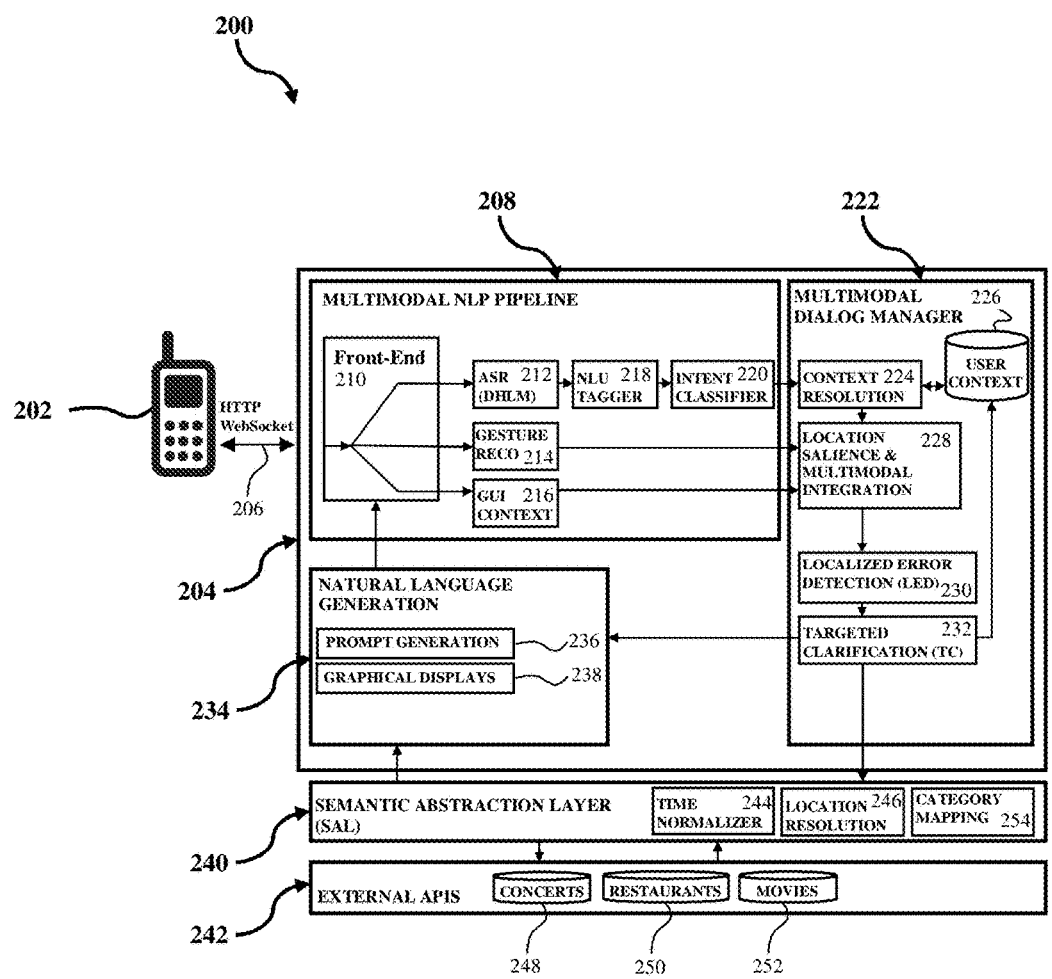
FIG. 2 illustrates a schematic of an exemplary system for a virtual assistant for event planning through an interactive multimodal dialog, according to an aspect of the present disclosure.

An exemplary embodiment of a network system for supporting the MVA is generally shown in FIG. 2 at 200. The MVA may be a mobile application that is executed by the client device 202. The client device 202 is shown as a cellular telephone. Nevertheless, in further embodiments the client device 202 may be, or be similar to, the computer system 100 as described with respect to FIG. 1. In this regard, embodiments of the client device 202 may include similar components or features as those discussed with respect to the computer system 100 of FIG. 1. The client device 202 may include each of the components or features, or any combination of the features or components. Of course, those of ordinary skill in the art appreciate that the client device 202 may also include additional or alternative components or features than those discussed with respect to the computer system 100 of FIG. 1 without departing from the scope of the present application. Also, while the device 202 is referred to as a "client" device 202, it should be known and understood that the device 202 or user thereof is not limited being a "client" in a preexisting or other relationship with the MVA server 204. Moreover, while FIG. 2 shows a separate client device 202 and MVA server 204, it is to be known and understood that additional embodiments of the present application comprise a system in which the described functions of the client device 202 and the MVA server 204 are integrated or combined as a single device.

The MVA allows a user of the client device 202 to plan a day or evening out with friends using natural language and gesture input. With this input, the user can search and browse over multiple interconnected domains, including music events, movie showings, and places to eat. The user can specify multiple different parameters in natural language, e.g., "jazz concerts around san Francisco next Saturday." As the user finds interesting events and places, the events and places can be collected together into a plan or plans which can be communicated and shared with others.

Figure 3A:
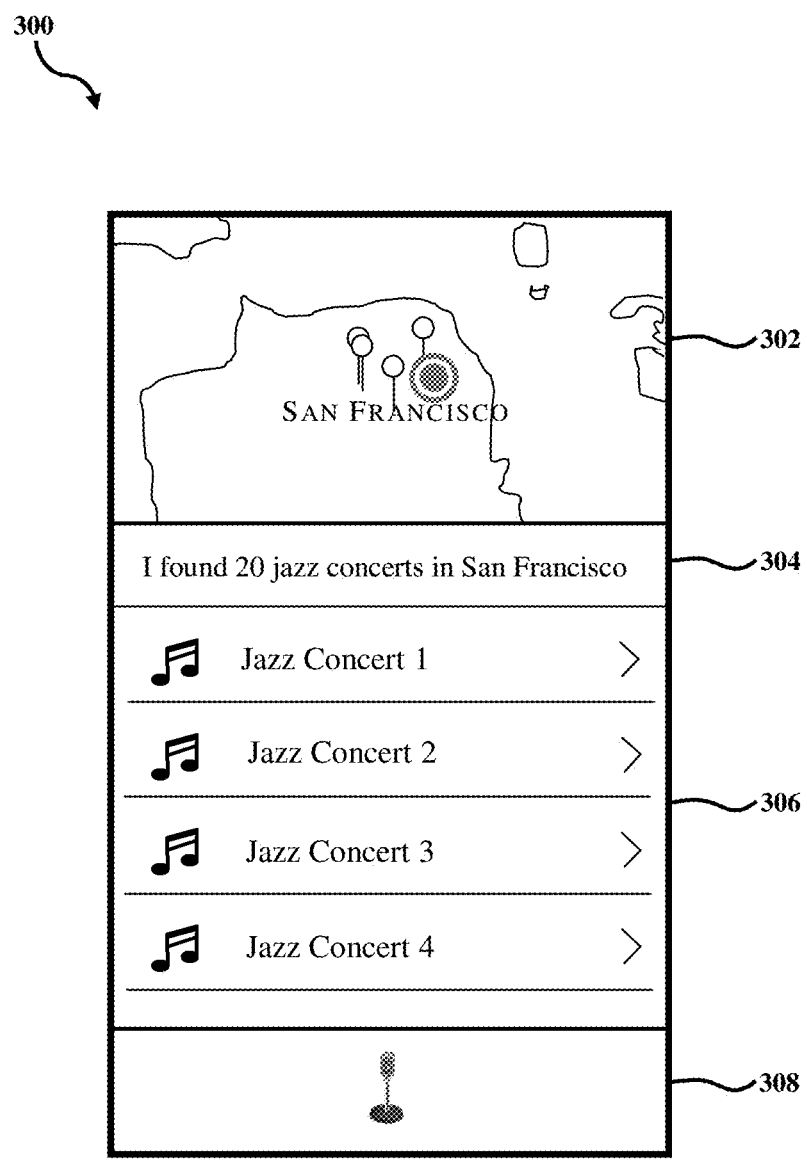
FIG. 3A illustrates an exemplary display of a client device, according to an aspect of the present disclosure.
Figure 3B:
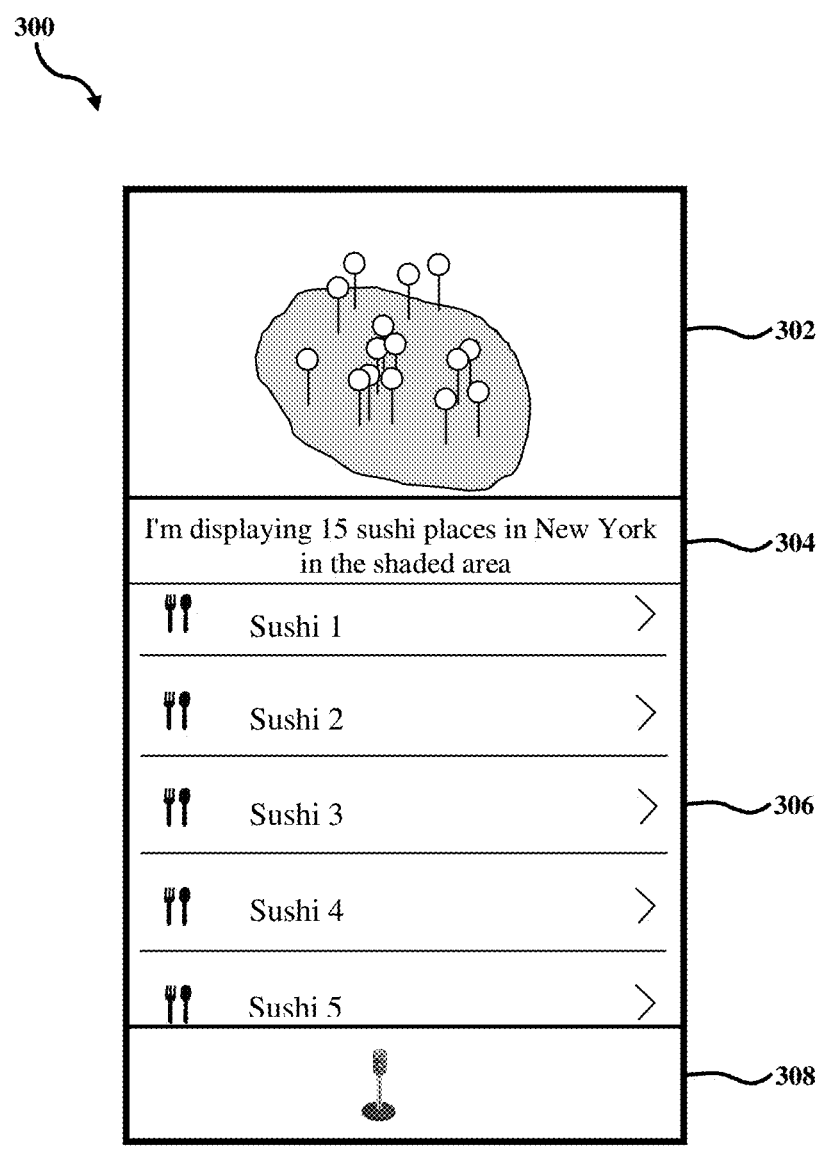
FIG. 3B illustrates an additional exemplary display of a client device, according to an aspect of the present disclosure.

The client device 202 includes a graphical user interface through which the user may search and browse the interconnected domains. Exemplary embodiments of the graphical user interface are generally shown in FIG. 3A and FIG. 3B at 300. In the exemplary embodiments, the graphical user interface 300 includes a dynamic map 302 and information display areas 304, 306 that are used to show the current recognition, MVA prompts, search results, and active plan elements. In this regard, the information display areas 304, 306 may comprise a summary display area 304 which summarizes the current recognition, MVA prompts, search results, or active plan elements. The information display areas 304, 306 may also comprise a detailed display area 304 which lists the current recognition, MVA prompts, search results, or active plan elements in detail. Of course, the information display areas 304, 306 and the graphical user interface 300 are merely exemplary and are not limiting or exhaustive.

Spoken inputs may be received by the MVA when the user taps a microphone area 308 of the graphical user interface 300. As the user speaks, incremental speech recognition results may be displayed in the information display areas 304, 306. In addition to enabling voice input, the microphone area 308 may also activate the dynamic map 302 as a drawing canvas enabling the user to issue coordinated multimodal commands combining speech with drawing as shown in FIG. 3B, e.g., "movies playing tonight in this area" [user outlines a relevant area on the map with finger] or "restaurants" [user draws a line on a specific street]. After end-pointing, the MVA determines the relevant intent and concepts of the input for database retrieval. The MVA may respond to the user input multi-modally, by both updating the graphical user interface 300 and using speech synthesis to output or summarize database retrieval results, provide feedback, and make requests for clarification and additional information. Of course, the above-examples are merely exemplary and are not limiting or exhaustive. Additional input methods may be used without departing from the scope of the present application.

A sample interaction from the MVA that illustrates some of its capabilities is shown below. The user of the client device 202 starts with a spoken natural language query where he or she specifies various constraints: the type of music (e.g., jazz), location (e.g., San Francisco), and time (e.g., tomorrow). The client device 202 or the MVA server 204 is uncertain of the location so it constructs a targeted clarification. The user specifies the location and then the client device 202 or the MVA server 204 proceeds to search for events meeting the constraints. The user then reviews the results the client device 202 or the MVA server 204 provides, and follows with a refinement, e.g., "what about blues." The client device 202 or the MVA server 204 applies contextually-aware natural language understanding and interprets the refinement as "blues concerts near San Francisco tomorrow." After selecting a concert, the user next searches for a restaurant nearby. The location of the concert remains salient. The user then follows up with a multimodal query combining speech and gesture to search for similar restaurants in an adjoining area.

User: "Jazz concerts near San Francisco tomorrow."
MVA: "Where did you want to see jazz tomorrow?"
User: "San Francisco."
System: "I found 20 jazz concerts in San Francisco tomorrow."
System: [Zooms map to San Francisco and displays pins on map and list of results]
User: "What about blues?"
System: "I found 20 blues concerts in San Francisco tomorrow."
User: [Clicks on a concert listing and adds it to the plan]
User: "Sushi restaurants near there."
System: "I found 10 sushi restaurants."
User: "What about here?"
User: [circles adjoining area on map]
System: "I found 5 sushi restaurants in the bluish purple area you indicated."

An exemplary architecture supporting the MVA application is shown in the network system 200 of FIG. 2. While the architecture is shown in a network environment, it should be appreciated that the MVA application may also exist in a stand-alone device such as, but not limited to, the client device 202.

In the network system 200, the user of the client device 202 interacts with a native operating system of the client device 202. When the user taps the click to speak icon of the microphone area 308, this initiates the flow of audio interleaved with gestures and contextual information streamed over a network connection 206 to the MVA server 204, or MVA platform. The network connection 206 is shown as being a WebSocket connection. Nevertheless, it should be appreciated that additional or alternative protocols can be used without departing from the scope of the present application.

The first part of the MVA server 204, or MVA platform, is a multimodal natural language processing (NLP) pipeline 208. The front-end interface 210 fields incoming packets of data from the client device 202, demuxes the incoming data stream, and sends audio, ink traces, and contextual information to three modules 212, 214, 216 that operate in parallel. The audio is processed using an automatic speech recognition (ASR) engine 212, such as the AT&T Watson$^{SM}$ speech recognition engine. The AT&T Watson$^{SM}$ speech recognition engine is described by Goffin et al. in "Proceedings of International Conference on Acoustics, Speech, and Signal Processing." Gesture recognition is performed using a gesture recognition engine 214, which may include a dynamic hierarchical language model combining a statistical N-gram language model with weighted sub-grammars. An exemplary hierarchical language model is described by Gilbert et al. in "Your mobile virtual assistant just got smarter!" Ink traces are processed by a graphical user interface (GUI) context engine 216, such as a gesture classifier. An exemplary gesture classifier is described by Rubine in "Specifying gestures by example."

The automatic speech recognition engine 212 results serve as input to two natural language understanding (NLU) modules 218, 220. A natural language understanding tagger 218, such as a discriminative stochastic sequence tagger, assigns tags to phrases within the input and then the overall string with tags is assigned by an intent classifier 220, such as a statistical intent classifier, to one of a number of intents handled by the network system 200 such as, but not limited to, search (e.g., music event) and refine (e.g., location).

The natural language understanding modules 218, 220 results are passed along with the gesture recognition engine 214 results and a specification of the graphical user interface context engine 216 context to a multimodal dialog manager 222. The multimodal dialog manager 222 includes a contextual resolution component 224 that determines if the input is a refinement or correction. In either case, the contextual resolution component 224 retrieves the previous command from a user context store 226, or database, and combines the new content with the context through destructive unification. An exemplary process of destructive unification is described by Ehlen et al. in "Multimodal dialogue in mobile local search." The multimodal dialog manager 222 also includes a location salience multimodal integration component 228 that applies to handle cases where a location is not specified verbally. The location salience multimodal integration component 228 uses a supervised classifier to select among a series of candidate locations, including the gesture (if present), the current device location, or the current map location. An exemplary embodiment of such a component is described by Ehlen et al. in "Location grounding in multimodal local search."

The resolved semantic interpretation of the utterance is next passed to a localized error detection (LED) module 230. An exemplary localized error detection module 230 is described by Stoyanchev et al. in "Localized detection of speech recognition errors." The localized error detection module 230 contains two maximum entropy classifiers that independently predict whether a concept is present in the input and whether a concept's current interpretation is correct. These classifiers may use word scores, segment length, confusion networks and other recognition/context features. The localized error detection module 230 uses these classifiers to produce two probability distributions; one for presence and one for correctness.

The probability distributions are then used by a targeted clarification (TC) component 232 to accept the input as is, reject all of the input, or ask a targeted clarification question. An exemplary targeted clarification component 232 is described by Stoyanchev et al. in "Modelling human clarification strategies." This decision can be done using manually tuned thresholds. In the targeted clarification case, the input is passed to a natural language generation component 234 for surface realization, and a prompt generation component 236 can generate a prompt that can be passed back to the client device 202 for playback to the user. The targeted clarification component 232 can also decide what to attempt to add to the common ground by explicit or implicit confirmation, and what to explicitly query from the user, e.g., "Where did you want to see jazz concerts?" The targeted clarification component 232 can also update the graphical user interface context module 216 via a graphical display component 238 so that incoming responses from the user can be interpreted with respect to the context set up by the targeted clarification component 232.

Once a command is accepted by the multimodal dialog manager 222, it is passed to the semantic abstraction layer (SAL) 240 for execution. The semantic abstraction layer 240 insulates natural language dialog capabilities from the specifics of any underlying external or internal application programming interfaces 242 that the network system 200 may use in order to respond to user queries. A general purpose time normalization component 244 takes natural language time expressions, e.g., "tomorrow night" or "next week," and a reference time from the context and estimates the corresponding time interval. A general purpose location resolution component 246 maps from natural language expressions of locations, city names, neighborhoods, etc. to the specific geographic coordinates. These functions are handled by the semantic abstraction layer 240 rather than relying on any time and location handling in the underlying information application programming interfaces 242 to provide consistency across application domains 248, 250, 252.

The semantic abstraction layer 240 also includes a category mapping component 254. The natural language understanding modules 218, 220 tag a portion of the utterance as a concept, e.g., a music genre or a cuisine, and the semantic abstraction layer 240 leverages this information to map a word sequence to generic domain-independent ontological representations or categories reusable across different back-end application programming interfaces. Wrappers in the semantic abstraction layer 240 map from these categories, time, and location values to the specific query language syntax and values for each specific underlying application programming interface. In some cases, a single natural language query to the MVA may require multiple different application programming interface calls to complete, and this is captured in the wrapper. The semantic abstraction layer 240 also handles application programming interface format differences by mapping all application programming interface responses into a unified format. This unified format is then passed to the natural language generation component 234 to be augmented with prompts, display text, and instructions for how to manipulate the client device 202. The combined specification of a multimodal presentation can be passed to the interaction manager and routed back to the client device 202 for presentation to the user.

Accordingly, the network system 200 provides a mobile multimodal virtual assistant that enables users to create plans for activities and share them with friends. The network system 200 enables the users to select generated results for the creation and sharing of user plans. The plans are constructed through multimodal, e.g., touch and voice, interaction with graphical displays combining dynamic maps, search listings, and visualization of plans.

The features of the network system 200 are described as modules, components, engines, devices, etc. In this regard, the features may be or comprise, or be similar to, the computer system 100 of FIG. 1. The features may also comprise any other hardware or software components as described herein, or any combination thereof. The features enable users to search for activities, construct multistage plans, and share and collaborate on these plans with groups of friends all in a single application through natural conversational multimodal dialog. These advantages and applications will become more apparent through the following exemplary methods of the MVA.

Figure 4:
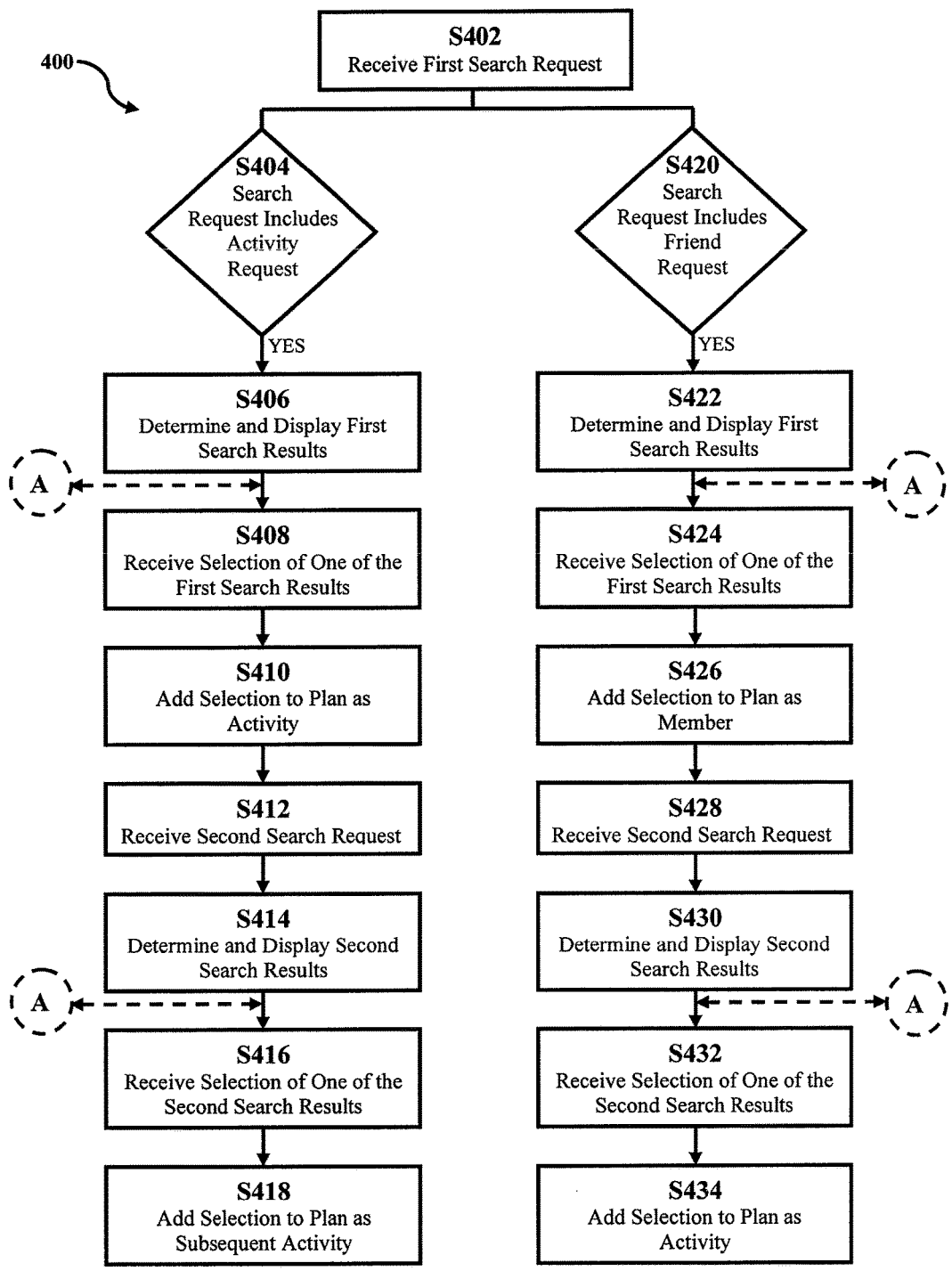
FIG. 4 illustrates an exemplary method of a virtual assistant for event planning through an interactive multimodal dialog, according to an aspect of the present disclosure.

An exemplary method of generating a plan through search inputs is generally shown in FIG. 4 at 400. The method 400 may comprise or be implemented by the MVA or network system 200 as described above. The method 400 may also comprise or be implemented by the client device 202, the MVA server 204 or platform, an application that is installed or embedded in client device 202 or the MVA server 204 or platform, or any combination thereof. The method 500 is described hereinafter as being implemented by the client device 202. Nevertheless, it is to be known an understood that the method may additionally or alternatively be implemented by the computer system 100, the network system 200, the MVA server 204, or any another other computing device without departing from the scope of the present application.

Figure 5:
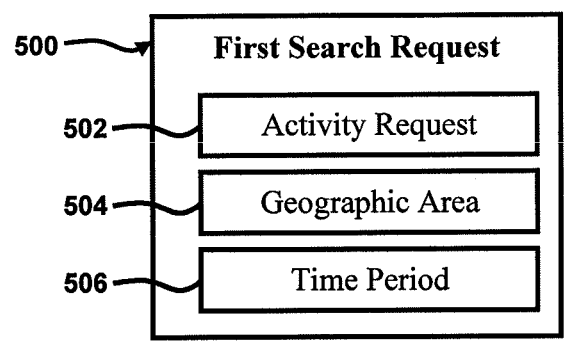
FIG. 5 illustrates an exemplary schematic of a search request for event planning through an interactive multimodal dialog, according to an aspect of the present disclosure.

The method receives a first search request at S502. The first search request may be received from a user of the client device 202. An exemplary embodiment of the first search request is generally indicated in FIG. 5 at 500. The first search request 500 may comprise, but is not limited to, an activity request 502, a geographic area 504, and a time period 506. For example, the first search request 500 may request sporting events in Chicago on a particular weekend. Additionally or alternatively, the first search request 500 may request a restaurant near the Washington Monument at a current time. Of course, these examples are merely exemplary and are not intended to be limiting or exhaustive. The first search request 500 may comprise additional or alternative information as known and understood in the art without departing from the scope of the present application.

Each component of the first search request 500, or any combination thereof, may be received by or from the client device 202. Alternatively, any component, or combination thereof, may be received or determined in accordance with any of the additional manners described herein.

The activity request 502 may include a request for any activity, event, thing, or other happening by the user of the client device 202. The activity request 502 may be wholly specified by the user, or determined wholly or in part by the client device 202 or the MVA server 204.

The geographic area 504 may specify a geographic region or location for the activity request 502. The geographic area 504 may also be wholly specified by the user, or determined wholly or in part by the client device 202 or the MVA server 204. For example, the geographic area 504 may be input to the client device 202 by the user, or the geographic area 504 may be determined by the client device 202 or the MVA server 204 in correspondence with a location of the client device 202. The geographic area 504 may additionally or alternatively be determined in accordance with further known methods. For example, the geographic area 504 may be determined based on a history or a default setting of the client device 202. In any event, a geographic area 504 is associated with the activity request 502 by the MVA server 204.

The time period 506 may indicate any specific date, date range, specific time, time range, or combination thereof. The time period 506 may also be wholly specified by the user, or determined wholly or in part by the client device 202 or the MVA server 204. For example, the time period 506 may be input to the client device 202 by the user, or the time period 506 may be determined by the client device 202 or the MVA server 204 in correspondence with a current time or the user's schedule. The time period 506 may default to a predetermined day, time, or combination thereof, or the time period 506 may automatically be set to the first available slot by referencing the user's schedule. In this regard, the MVA may be configured to default to planning dinner dates or meetings, and the time period may default to a dinner time slot of six o'clock to eight o'clock for pre-selected days of the week. The time period 506 may also be determined based on the activity request 502, geographic area 504, or combination thereof. For example, if the user searches for restaurants in a dinner district, the MVA server 204 may automatically set the time period 506 to a dinner time slot, or to a lunch time slot depending on the current time. The MVA 204 server may even reference the user's schedule or history to determine a day for the time period 506. That is, if the user frequently plans dinners on Friday and searches for a restaurant, the MVA server 204 may automatically set the time period 506 as being for a dinner time slot on Friday, or the next available evening based on the user's schedule. Of course, the above-examples are merely exemplary and are not intended to be limiting or exhaustive. The time period 506 may be determined in accordance with additional or alternative methods as known and understood in the art without departing from the scope of the present application.

Figure 6:
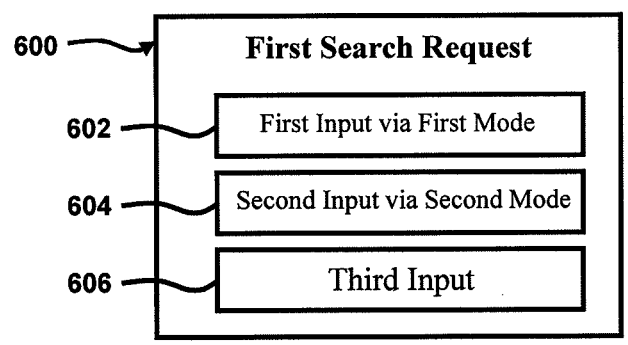
FIG. 6 illustrates another exemplary schematic of a search request for event planning through an interactive multimodal dialog, according to an aspect of the present disclosure.

As discussed above, the first search request may be received by the client device 202 from a user thereof. An exemplary embodiment of such a first search request which is received by the client device 202 is generally indicated in FIG. 6 at 600. In this regard, the first search request 600 comprises a first input 602, a second input 604, and a third input 606. The first input 602 may be received via a first input mode, the second input 604 may be received via a second input mode, and the third input 606 may be received via either the first input mode, the second input mode, or a third input mode. The first input mode, the second input mode, and the third input mode may be different from one another. While the search request 600 is shown as including three inputs, those of ordinary skill in the art appreciate that the search request 600 may include any combination of the three inputs as well as additional or alternative inputs in further embodiments of the present application.

According to an embodiment of the present application, the first input 602 that is received via the first input mode may comprise the activity request 502, and the second input 604 that is received via the second input mode may comprise the geographic area 504. The third input 606 may comprise the time period 506.

The first input 602 may comprise speech or a spoken query that is received by the client device 202. The speech or the spoken query may be received by a microphone of the client device 202. The speech or the spoken query may be processed by the MVA server 204 as generally discussed above for determining the activity request 502. In particular, the speech or the spoken query may be processed by the MVA server 204 for determining a type of the activity request 502 such as, but not limited to, a restaurant, sporting event, concert, historical site, commercial establishment, etc.

The second input 604 may comprise a gesture or a touch query that is received by the client device 202. The gesture or the touch query may be received by a display of the client device 202. The gesture or the touch query may be processed by the client device 202 or the MVA server 204 as generally discussed above for determining the geographic area 504. In this regard, the gesture or the touch query may include the user of the client device 202 interacting with a map which is displayed on the display of the client device 202. The user may encircle the geographic area 504 on the map, or identify the geographic area 504 by contacting a specific location on the map. Of course, these methods for indicting the geographic area 504 with the gesture or the touch query are merely exemplary and are not limiting or exhaustive. For example, in further embodiments the user may specify the geographic area 504 by manipulating the map or any other display element via a sliding or zooming operation. The user may also specify the geographic area 504 by drawing a route on the map. The route may comprise a line or other combination of segments or inputs which indicates a predetermined or estimated route of the user.

In further embodiments of the present application, the second input 604 may comprise additional or alternative inputs for specifying the geographic area 504. For example, the second input 604 may comprise a gesture or a movement of the client device 202 by the user. The user may request the MVA to find a type of activity, such as a restaurant, which is located in a particular direction from a current position of the client device 202. In such embodiments, the second input 604 specifies a direction to the geographic area 504 for the activity request 502. The user may point or aim the client device 202 in the particular direction, or the user may wave or motion the client device 202 toward the particular direction. Of course, these methods for indicting the geographic area 504 with the gesture or the movement of the client device 202 are merely exemplary and are not limiting or exhaustive. For example, in further embodiments the user may specify the geographic area 504 by rotating the client device 202 or positioning the client device 202 relative to a predetermined object.

In even further embodiments of the present application, the second input 604 may comprise an image input to the client device 202 by the user. The user may request the MVA to find a type of activity, such as a restaurant, which is located near a particular scene or identifier contained within the image. In such embodiments, the image may be captured with a camera of the client device 202. The client device 202 or the MVA server 204 may analyze the captured image to identify a current location of the client device or a location within the image for determining the geographic area 504. According to such an embodiment, if a user is in an unfamiliar place, the user may request the MVA to find a type of activity, such as a restaurant, which is near the user's current location upon the user capturing an image with the client device 202. As a result, the user is not required to know or enter any specific geographic information for identifying an activity in the vicinity of the user. Of course, the method for indicting the geographic area 504 with the captured image is exemplary and is not limiting or exhaustive. In further embodiments, the user may specify the geographic area 504 by downloading or otherwise obtaining an image from the Internet, a friend, or via any other means which are known and understood in the art. According to such embodiments, the user may search for a type of activity, such as a restaurant, which is near a landmark or locale that the user intends to visit.

The third input 606 may comprise any of the inputs discussed herein with respect to the first input 602 and the second input 604. Additionally or alternatively, the third input may comprise any additional input that is generally known and understood. Moreover, it is to be known and understood that the above-described inputs and examples are merely exemplary and are not exhaustive or exclusive. Further inputs may be used in additional or alternative embodiments of the present application. For example, any of the first, second, and third inputs 602, 604, 606 may comprise further input modes such as, but not limited to, scanning a code or image.

In an embodiment of the method 400, the MVA may determine whether the search request 500 includes the activity request 502, which is associated with the geographic area 504, at S404. When the search request 500 includes the activity request 502, the MVA determines and displays first search results at S406. The client device 202 or the MVA server 204 may determine and display the first search results in accordance with the description with respect to FIG. 2.

The first search results are determined based on the first search request 500 and correspond to the geographic area 504. Each of the first search results is associated with a geographic location, and may be displayed on a map on the display of the client device 202 in correspondence with the geographic location. For example, the first search results may be displayed as generally shown in FIGS. 3A and 3B. The first search results may be shown on the dynamic map 302 at their respective locations, and may also be identified in the information display areas 304, 306.

Figure 7:
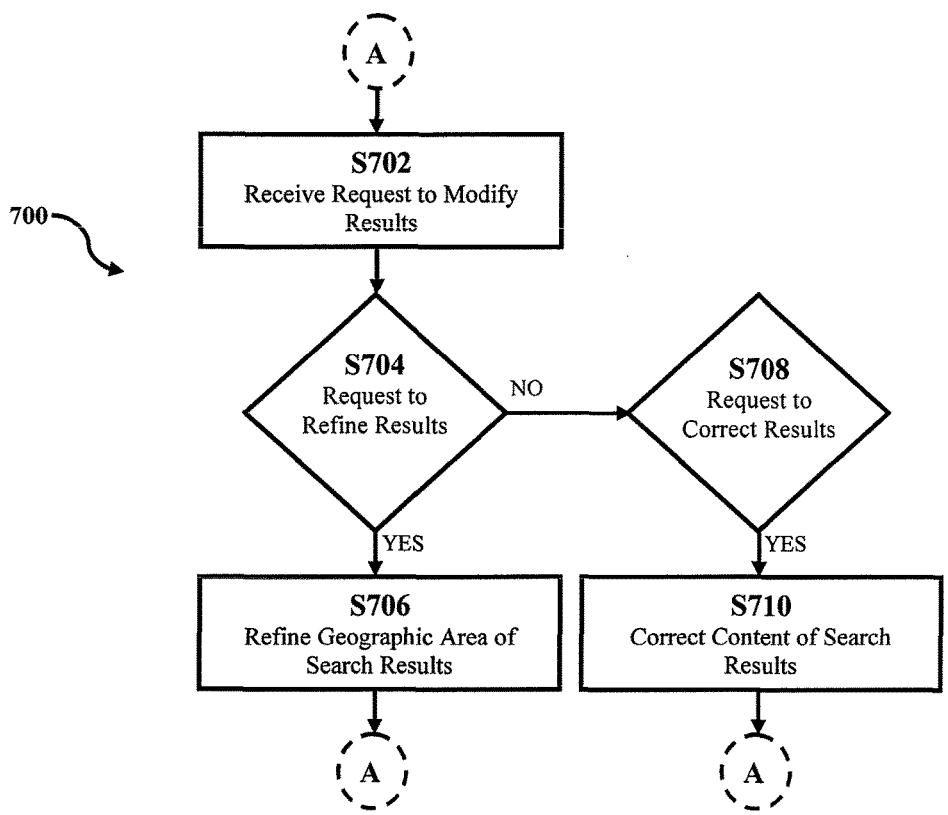
FIG. 7 illustrates an exemplary method of modifying search results for event planning through an interactive multimodal dialog, according to an aspect of the present disclosure.

An embodiment of the method 400 provides for a refinement and correction process of the first search results, as shown at A. The refinement and correction process is generally shown in FIG. 7 at 700. After the MVA generates and displays the first search results, a request to modify the first search results may be received from the user of the client device 202 at S702. The request may be to modify the first search results which are displayed on the client device 202. Even more specifically, the request may be to refine the first search results which are displayed on the dynamic map 302 at their respective locations.

Upon receiving the request, the MVA may determine whether the request is to refine the first search results at S704. The request may include a refinement of a displayed area of the dynamic map 302 of the client device 202. The refinement may include an adjustment or correction to the geographic area 504 upon which the first search results are based. The refinement may narrow the geographic area 504, broaden the geographic area 504, or change the geographic area 504. The refinement may be specified by the user of the client device 202 manipulating the dynamic map 302 upon which the first search results are displayed. The user may zoom-in or zoom-out on the dynamic map 302. The user may additionally or alternatively circle an area on the dynamic map 302 as generally shown by FIG. 3B. Of course, these methods of manipulating the dynamic map 302 are not exhaustive, and the user may adjust or correct the geographic area 504 in accordance with further methods which are known and understood in the art.

The refinement request may comprise a single mode input by the user. That is, the user may manipulate the dynamic map 302 as described above, and the MVA may refine the geographic area 504 based thereupon. Additionally or alternatively, the refinement may comprise a multimodal input.

For example, the user of the client device 202 may input speech of "what about here" while circling an area on the dynamic map 302. In this regard, the MVA may determine that the request to modify the first search results is the refinement request at S702 based on the multimodal input. The MVA may consider speech and gesture inputs, or any other combination of inputs, which are received simultaneously or within a predetermined time period from one another as comprising a multimodal input.

Upon determining that the request includes a refinement of the first search results at S704, the MVA modifies the first search results based on the refinement at S706. The MVA may refine the geographic area 504 upon which the first search results are based, and display refined search results on the client device 202 based on a refined geographic area. The MVA may display the refined search results on the dynamic map 302 at their corresponding locations. The MVA may request a confirmation of the refinement from the user. Alternatively, the MVA may present the refined results to the user whereupon the user may re-engage in the refinement and correction process 700 if necessary.

In addition to the refinement process of S704 to S706, the refinement and correction process 700 may also include a correction process at S708 to S710. FIG. 7 is shown as including both the refinement and correction processes. However, it should be known and understood that embodiments of the present application may include only one or none of the processes. Upon receiving the request to modify the first search results at S702 or after determining that the request is not a refinement request at S704, the MVA may determine whether the request to modify the first search results includes a correction of the activity request 502 at S708. Upon determining that the request includes a correction request for the activity request 502 or a correction of the type of the first search request 500, the MVA modifies the first search results on the dynamic map 302 of the client device 202 based on the correction request at S710.

Accordingly, the method 400 displays the first search results at S406 of FIG. 4, and may receive any refinements or corrections of the first search results in accordance with the refinement and correction process 700 of FIG. 7. Thereafter, the MVA receives a selection of one of the search results from the client device 202 at S408. The MVA may receive the selection via any speech or gesture input, or other input to the client device 202 from the user thereof in accordance with any known and understood manner.

Figure 8:
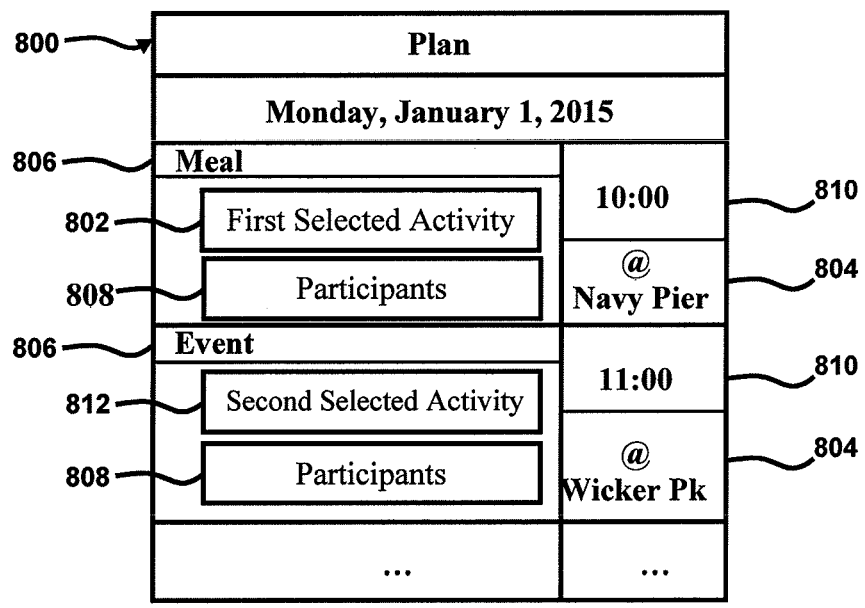
FIG. 8 illustrates an exemplary schematic of a plan produced by an interactive multimodal dialog, according to an aspect of the present disclosure.

Upon receiving the selection at S408, the selected one of the first search results is added to a plan at S410. An exemplary embodiment of a plan is generally indicated in FIG. 8 at 800. The plan 800 may comprise part of or be included within a schedule of the user of the client device 202. The schedule may be supported by the client device 202 or any application or program stored thereon, such as a calendar application or program. The plan 800 may also be supported by the MVA. The plan 800 may be unique to the user of the client device 202, or the plan 800 may be shared with additional users by the user of the client device 202 or by the MVA. The user or the MVA may invite the additional users to participate in the plan, such as via a social media application. The plan 800 of FIG. 8 is merely exemplary and should not be considered limiting or exhaustive. Additional or alternative plans or components thereof may be included in additional embodiments without departing from the scope of the application.

When the first search request 500 includes the activity request 502 as determined at S404, the selected one of the first search results is added to the plan 800 as a first selected activity 802 at S410. As shown in FIG. 8, the first selected activity 802 may be added to the plan in correspondence with its corresponding geographic location 804. The first search request 500 may be associated with or include a type of activity. For example, if the first search request 500 is a request for a dinner reservation, the first search request 500 may be associated with a type of activity of "meal." In this regard, the plan may further indicate a type of activity 806 of the first selected activity 802, as shown in FIG. 8. The first selected activity 802 may also identify any participants 808 thereof. The participants 808 may be added to the first selected activity 802 by the user of the client device 202 or the MVA, may join the first selected activity 802, or be specified in accordance with any other known and understood methods.

According to embodiments in which the first search request 500 includes the time period 506, each of the first search results may be determined to correspond to a time slot within the time period 506 at S406. The first selected activity 802 may be added to the plan 800 in correspondence with a corresponding time slot 810 of the first selected activity 802. The time slot 810 may correspond to a start time of the first selected activity 802, or the time slot 810 may correspond to a duration of the first selected activity 802. The duration of the first selected activity 802 may correspond to a known duration, or the duration may be approximated by the user of the client device 202 or the MVA. In embodiments of the present application, the MVA may approximate the duration based on the type of activity 806. For example, if the type of activity 806 is "meal," the MVA may approximate the duration as being two hours. In additional embodiments of the present application, the type of activity 806 may further include subtypes of activities. For example, the type of activity 806 of "meal" may include subtypes of "lunch" and "dinner." The subtypes may be specified by the user of the device 202, or automatically determined or approximated by the MVA based the first selected activity 802. In this regard, each of the subtypes of activities may be associated with a time slot of a different duration. For example, the subtype of "lunch" may be associated with a duration of one hour while the subtype of "dinner" may be associated with a duration of two hours. These examples are merely exemplary and should not be considered limiting or exhaustive. The MVA may include additional and alternative methods for determining the time slot 810 of the first selected activity 802 without departing from the scope of the present application.

After the first selected activity 802 is added to the plan 800 at S410, a second search request may be received from the user of the client device 202 at S412. The second search request may be received in a same or similar manner as the first search request 500 in S402. The second search request may also be the same or similar to the first search request 500 of FIG. 5. Additionally or alternatively, the second search request may be based on the first selected activity 802, with the MVA automatically determining search criteria for the second search request. That is, a geographic area of the second search request may be set as the geographic area 504 of the first search request 500. The geographic area of the second search request may additionally or alternatively be set as the geographic location 804 of the first selected activity 802.

When the first selected activity 802 includes the type of activity 806, the second search request may automatically be associated with or default to a second type of activity which is in a predetermined relationship with the type of activity 806 of the first selected activity 802. For example, when the type of activity 806 is "meal," the second search request may automatically be associated with or default to a second type of activity of "event." As a result, the user may simply and easily create a logical plan in which the user engages in an evening event after eating dinner. Of course, these examples are merely exemplary and are not limiting or exhaustive.

When the first selected activity 802 corresponds to a time slot 810, the second search request may automatically be associated with or default to a time period which is in a predetermined relationship with the time slot 810 of the first selected activity 802. For example, the second search request may automatically be associated with or default to a time period which is subsequent to the time slot 810 of the first selected activity 802 or prior to the time slot 810 of the first selected activity 802. In this regard, in a non-limiting and exemplary embodiment of the present application in which the target goal for the evening is dinner and a movie, the second search request may facilitate selection of a show after a dinner reservation. Alternatively, the second search request may facilitate selection of a dinner before the show depending on show times and travel times. In any event, a timewise series of events or activities may be created.

The second search request may additionally or alternatively be associated with or default to a time period which begins a predetermined time period after the time slot 810 of the first selected activity 802. The predetermined time period may account for a grace period. That is, the predetermined time period may begin fifteen minutes after the time slot 810, or end thereof, to account for travel or other time. Additionally or alternatively, the predetermined time period may be determined based on the first selected activity 802 or the type of activity 806 of the first selected activity 802. In this regard, the predetermined time period may be set by the user, determined by the MVA based on a user history, or be automatically set by the MVA. For example, if the type of activity 806 of the first selected activity 802 is "meal," the predetermined time period may be set or determined to begin two hours after the time slot 810, or start thereof. The predetermined time period may additionally or alternatively be determined based on any subtypes of the type of activity 806. Accordingly, by associating the second search request with the time slot 810 of the first selected activity 802, the user may even more simply and easily create a logical plan in which the user engages in a series of successive events or activities in a timely manner. Of course, the above examples are merely exemplary and are not limiting or exhaustive.

After the second search request is received at S412, second search results are determined and displayed at S414. The second search results are determined and displayed based on the second search request. The second search results may be determined and displayed based on the geographic location 804 of the first selected activity 802. Moreover, in embodiments in which the first selected activity 802 corresponds to the time slot 810, the second search results are determined based on the time slot 810. For example, each of the second search results may correspond to a time subsequent to the time slot of the first selected activity 802.

The second search results may be determined and selected in accordance with similar manners as discussed with respect to the first search results, and as described in more detail with respect to FIG. 2. The second search requests may be refined and/or corrected in accordance with the refinement and correction process 700 of FIG. 7, if necessary.

The method 400 may receive a selection of one of the second search results at S416, whereupon the selected one of the second search results is added to the plan 800 at S418.

The selected one of the second search results is shown in FIG. 8 at 812. The second selected activity 812 may be added to the plan 800 in association with the geographic location 804, the type of activity 806, the participants 808, and the time slot 810 as generally discussed above with respect to the first selected activity 802. As a result, the method 400 has facilitated the creation of the logical plan in which the user, and any additional participants, may successively engage in the series of events or activities, including the first selected activity 802 and the second selected activity 812. The second selected activity 812 may be determined directly in correspondence with the geographic location 804 and the time slot 810 of the first selected activity 802, thereby enabling the user and any additional participants to easily transition from the first selected activity 802 to the second selected activity 812 in a timely manner.

The method 400 of FIG. 4 shows an additional or alternative manner of creating the plan 800 at S420 to S434. According to the additional or alternative manner, the user of the client device 202 may search a friend or contact list for friends or contacts which are located in a particular geographic area, available during a particular time period, or both. For example, if the user is visiting San Francisco, the user may search his or her contact list for any contacts which are located in San Francisco and which are available during the particular time period of the visit. Thereafter, the method 400 facilitates the selection of an activity or event which is located in San Francisco during the particular time period, so that the user and any available contacts may participate in the activity or event.

Figure 9:
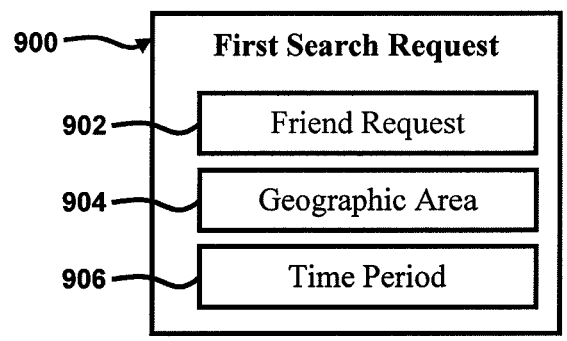
FIG. 9 illustrates a further exemplary schematic of a search request for event planning through an interactive multimodal dialog, according to an aspect of the present disclosure.

In this regard, the method 400 may receive a first search request at S402 as generally indicated in FIG. 9 at 900. The first search request 900 may comprise a friend request 902 in addition or alternatively to the activity request 502 of the first search request 500 of FIG. 5. The friend request 902 may include or identify a friend list. The friend list may comprise a contact list stored by the client device 202, or any other friend or contact list included within a social media application. Accordingly, the user may search for friends from among any friend or contact list for which to participate in an activity or event.

In addition to the friend request 902, the first search request 900 may comprise a geographic area 904, a time period 906, or combination thereof as discussed above with respect to the geographic area 504 and the time period 506 of FIG. 5. As a result, the user may search for friends within the geographic area 904 and/or that are available during the time period 906 for which to participate in the activity.

Upon determining that the first search request 900 includes the friend request 902 at S420, the MVA determines and displays first search results which comprise friends that are available in the geographic area 904 and/or that are available during the time period 906 at S422. That is, each of the first search results of S422 may be selected from the friend or contact list based on availability during the time period 906. The availability of the friends or contacts may be determined by referencing a schedule of each friend or contact of the friend or contact list. The schedules of the friends or contacts may be referenced via a social media application, for example. Each of the first search results of S422 may additionally or alternatively be selected from the friend or contact list based location within the geographic area 904. In this regard, the MVA may determine a geographic location of each friend or contact based on information included within the friend or contact list or by referencing a social media application.

The first search results of S422 may be determined in accordance with similar manners as discussed with respect to S406 and as described in more detail with respect to FIG. 2. The first search requests of S422 may be refined and/or corrected in accordance with the refinement and correction process 700 of FIG. 7, if necessary.

The MVA receives a selection of one of the friends or contacts from among the first search results at S424, and adds the selected friend or contact to the plan 800 as one of the participants 808 at S426. The selected friend or contact may also be added to the plan 800 in correspondence with the geographic location of the selected friend or contact, or in accordance with the geographic area 904 of the first search request 900. The selected friend or contact may further be added to the plan in correspondence with the time period 906 of the first search request 900.

Thereafter, the MVA receives a second search request at S428. The second search request may be the same or similar to the first search request 500 of FIG. 5. That is, the second search request may comprise an activity request, such as the activity request described with respect to 502 of FIG. 5. The second search request may be received in the same or similar manner as any of the first and second search requests of S402 and S412.

The MVA determines and displays second search results at S430. The second search results are determined based on the activity request of the second search request. In addition, the second search results are determined based on the geographic location of the selected friend or contact, which is selected from among the first search results in S424 and added to the plan 800 as one of the participants 808 in S426. The second search results may additionally or alternatively be determined based on the time period 906 which is specified with the first search request 900. In any event, the second search results of S430 comprise activities or events which are determined based on at least one of the geographic location and an available time period of the selected friend or contact.

The second search results of S430 may be determined in accordance with similar manners as discussed with respect to the first and second search results of S406 and S414, and as described in more detail with respect to FIG. 2. Moreover, the second search requests of S430 may be refined and/or corrected in accordance with the refinement and correction process 700 of FIG. 7, if necessary. The MVA may receive a selection of one of the second search results at S432, and the selected activity may be added to the plan 800 as the first selected activity 802 at S434.

Accordingly, in accordance with S420 to S434 of the method 400, the user may search from among a friend or contact list for friends who are located in the geographic area 904, available during the time period 906, or both. Thereafter, the user may search for events or activities which are located near a geographic location of a selected friend, which take place during the availability of the selected friend, or both. Thus, the method 400 facilitates the planning of an activity or event with a friend, based on the location and availability of the friend.

Of course, those skilled in the art appreciate that the above-described method 400 is merely exemplary and that the present disclosure includes various additional and alternative methods in accordance with the teachings and disclosure set forth herein. Moreover, those of ordinary skill in the art understand the various processes and methods described herein may be implemented by various devices, systems, computer programs, and computer-readable media including executable instructions. The devices, systems, computer programs, and computer-readable media, when executed, may implement any of the various processes, methods, or combinations thereof disclosed herein.

Accordingly, systems, methods, and media for creating and sharing plans through multimodal dialog enable users to construct, share, and collaborate on plans more quickly. Conventional mobile devices are unable to create and share such plans. At present, users are limited to copying results found within a voice search application and pasting them into a social application. The experience would be one of manually moving data from one application to another while achieving less desirable results. In contrast, the MVA enables users to interact with a single virtual agent that uses a combination of voice output and graphical displays to present information to the users and allows them to use speech, gesture, and graphical user interface manipulation to construct and share the plans.

Although systems, methods, and media for creating and sharing plans through multimodal dialog have been described with reference to several exemplary embodiments, it is understood that the words that have been used are words of description and illustration, rather than words of limitation. Changes may be made within the purview of the appended claims, as presently stated and as amended, without departing from the scope and spirit of the systems, methods, and media for creating and sharing plans through multimodal dialog in their aspects.

Although systems, methods, and media for creating and sharing plans through multimodal dialog have been described with reference to particular means, materials and embodiments, the systems, methods, and media for creating and sharing plans through multimodal dialog are not intended to be limited to the particulars disclosed; rather the systems, methods, and media for creating and sharing plans through multimodal dialog extend to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards such as a WebSocket connection represent examples of the state of the art. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to a non-limiting embodiment of the present disclosure, a method of creating a plan through search inputs is provided. The method includes receiving a first search request by a device. The first search request comprises a geographic area. The method displays first search results on a display of the device in response to receiving the first search request. The first search results are based on the first search request and correspond to the geographic area, with each of the first search results being associated with a geographic location. The method further receives a selection of one of the first search results by the device, adds the one of the first search results to a plan, receives a second search request by the device after receiving the selection, and displays second search results on the display of the device in response to receiving the second search request. The second search results are based on the second search request and corresponding to the geographic location of the one of the first search results.

According to one aspect of the present disclosure, the first search request comprises a first input received by the device via a first input mode and a second input received by the device via a second input mode different than the first input mode.

According to another aspect of the present disclosure, the first input comprises a spoken query received by a microphone of the device, and the second input comprises a touch query received by the display of the device. The spoken query specifies a type of the first search results, and the touch query specifies the geographic area of the first search results According to yet another aspect of the present disclosure, the touch query encircles the geographic area on a map displayed on the display of the device, contacts the geographic area on the map displayed on the display of the device, or specifies the geographic area as a route on the map displayed on the display of the device.

According to still another aspect of the present disclosure, the first input comprises a spoken query received by a microphone of the device, and the second input comprises a direction of movement of the device. The spoken query specifies a type of the first search results, and the direction of movement specifies a direction to the geographic area of the first search results.

According to an additional aspect of the present disclosure, the first input comprises a spoken query received by a microphone of the device, and the second input comprises an image received by a camera of the device. The spoken query specifies a type of the first search results, and the image identifies the geographic area of the first search results.

According to another aspect of the present disclosure, the first search request further comprises a type of the first search results and a time period for the first search results.

According to yet another aspect of the present disclosure, the first search results correspond to the type and the time period, with each of the first search results corresponding to a time slot within the time period. In this regard, the one of the first search results is added to the plan as an activity in association with the time slot of the one of the first search results.

According to still another aspect of the present disclosure, each of the second search results corresponds to a time subsequent to the time slot of the one of the first search results.

According to an additional aspect of the present disclosure, the first search request identifies a friend list and a time period for the first search results.

According to another aspect of the present disclosure, each of the first search results is selected from the friend list based on an availability during the time period, with the availability being determined by referencing a schedule of each friend of the friend list. The one of the first search results is added to the plan as a participating member during the time period.

According to yet another aspect of the present disclosure, each of the second search results is determined based on the time period.

According to still another aspect of the present disclosure, the first search results are displayed on a map on the display of the device in correspondence with the geographic location of each of the first search results.

According to an additional aspect of the present disclosure, the method receives a request to modify the first search results displayed on the display by the device. The request includes a refinement of a displayed area of the map on the display. The method further modifies the first search results on the display of the device based on the refinement of the displayed area.

According to another aspect of the present disclosure, the method determines whether the request to modify the first search results includes one of the refinement of the displayed area and a correction of a type of the first search results. In this regard, the first search results are modified on the display of the device based on the refinement in response to a determination that the request to modify the first search results includes the refinement of the displayed area.

According to yet another aspect of the present disclosure, the method receives a request to modify the first search results displayed on the display by the device. The request includes a refinement of a displayed area of the map on the display. The method further modifies the first search results on the display of the device based on the refinement of the displayed area.

According to still another aspect of the present disclosure, the second search results are displayed on a map on the display of the device in correspondence with the geographic location of the one of the first search results. The method receives a request to modify the second search results displayed on the display by the device, with the request including a refinement of a displayed area of the map on the display. The method determines whether the request to modify the second search results includes one of the refinement of the displayed area and a correction of a type of the second search results, and modifies the second search results on the display of the device based on the refinement of the displayed area.

According to yet another aspect of the present disclosure, the method receives a selection of one of the second search results by the device, and adds the one of the second search results to the plan.

According to another non-limiting embodiment of the present disclosure, a device for creating a plan through search inputs is provided. The device includes a display, a processor, and a memory storing instructions that, when executed by the processor, cause the processor to perform operations. The operations are the same or similar to the features of the methods described herein.

According to yet another non-limiting embodiment of the present disclosure, a tangible computer-readable medium encoded with an executable computer program for creating a plan through search inputs that, when executed by a processor, causes the processor to perform operations is provided. The operations are the same or similar to the features of the methods described herein.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of creating a plan through search inputs, the method comprising:
  receiving a first search request by a device, the first search request comprising a geographic area;
  displaying first search results on a display of the device in response to receiving the first search request, the first search results being based on the first search request and corresponding to the geographic area, each of the first search results being associated with a geographic location;
  receiving a selection of one of the first search results by the device;
  adding the one of the first search results to a plan;
  receiving a second search request by the device after receiving the selection; and
  displaying second search results on the display of the device in response to receiving the second search request, the second search results being based on the second search request and corresponding to the geographic location of the one of the first search results,
  wherein the first search request comprises a first input received by the device via a first input mode and a second input received by the device via a second input mode different than the first input mode,
  the first input comprises a spoken query received by a microphone of the device, the spoken query specifying a type of the first search results,
  the first search results are displayed on a map on the display of the device in correspondence with the geographic location of each of the first search results, and
  the second search results are displayed on the map on the display of the device in correspondence with the geographic location of the one of the first search results.

2. The method according to claim 1, wherein
the second input comprises a touch query received by the display of the device, the touch query specifying the geographic area of the first search results.

3. The method according to claim 2, wherein
the touch query at least one of encircles the geographic area on a map displayed on the display of the device, contacts the geographic area on the map displayed on the display of the device, and specifies the geographic area as a route on the map displayed on the display of the device.

4. The method according to claim 1, wherein
the second input comprises a direction of movement of the device, the direction of movement specifying a direction to the geographic area of the first search results.

5. The method according to claim 1, wherein
the second input comprises an image received by a camera of the device, the image identifying the geographic area of the first search results.

6. The method according to claim 1, wherein
the first search request further comprises the type of the first search results and a time period for the first search results.

7. The method according to claim 6, wherein
the first search results correspond to the type and the time period, each of the first search results corresponding to a time slot within the time period, and
the one of the first search results is added to the plan as an activity in association with the time slot of the one of the first search results.

8. The method according to claim 7, wherein
each of the second search results corresponds to a time subsequent to the time slot of the one of the first search results.

9. The method according to claim 1, wherein
the first search request identifies a friend list and a time period for the first search results.

10. The method according to claim 9, wherein
each of the first search results is selected from the friend list based on an availability during the time period, the availability being determined by referencing a schedule of each friend of the friend list, and
the one of the first search results being added to the plan as a participating member during the time period.

11. The method according to claim 10, wherein
each of the second search results is determined based on the time period.

12. The method according to claim 1, further comprising:
receiving a request to modify the first search results displayed on the display by the device, the request including a refinement of a displayed area of the map on the display; and
modifying the first search results on the display of the device based on the refinement of the displayed area.

13. The method according to claim 12, further comprising:
determining whether the request to modify the first search results includes one of the refinement of the displayed area and a correction of the type of the first search results,
wherein the first search results are modified on the display of the device based on the refinement in response to a determination that the request to modify the first search results includes the refinement of the displayed area.

14. The method according to claim 1, further comprising:
receiving a request to modify the first search results displayed on the display by the device; and
modifying the first search results on the display of the device based on the request.

15. The method according to claim 1, further comprising:
receiving a request to modify the second search results displayed on the display by the device, the request including a refinement of a displayed area of the map on the display;
determining whether the request to modify the second search results includes one of the refinement of the displayed area and a correction of a type of the second search results; and
modifying the second search results on the display of the device based on the refinement of the displayed area.

16. The method according to claim 1, further comprising:
receiving a selection of one of the second search results by the device;
adding the one of the second search results to the plan.

17. A device for creating a plan through search inputs, the device comprising:
a display;
a microphone;
a processor; and
a memory storing instructions that, when executed by the processor, cause the processor to perform operations including:
receiving a first search request, the first search request comprising a geographic area;
displaying first search results on the display in response to receiving the first search request, the first search results being based on the first search request and corresponding to the geographic area, each of the first search results being associated with a geographic location;
receiving a selection of one of the first search results;
adding the one of the first search results to a plan;
receiving a second search request after receiving the selection; and
displaying second search results on the display in response to receiving the second search request, the second search results being based on the second search request and corresponding to the geographic location of the one of the first search results,
wherein the first search request comprises a first input received via a first input mode and a second input received via a second input mode different than the first input mode,
the first input comprises a spoken query received by the microphone, the spoken query specifying a type of the first search results,
the first search results are displayed on a map on the display in correspondence with the geographic location of each of the first search results, and
the second search results are displayed on the map on the display in correspondence with the geographic location of the one of the first search results.

18. The device according to claim 17, wherein
the second input comprises a touch query received by the display of the device, the touch query specifying the geographic area of the first search results.

19. The device according to claim 17, further comprising:
a camera,
wherein the second input comprises an image received by the camera, the image identifying the geographic area of the first search results.

20. A tangible computer-readable medium encoded with an executable computer program for creating a plan through search inputs that, when executed by a processor, causes the processor to perform operations comprising:
receiving a first search request by a device, the first search request comprising a geographic area;
displaying first search results on a display of the device in response to receiving the first search request, the first search results being based on the first search request and corresponding to the geographic area, each of the first search results being associated with a geographic location;
receiving a selection of one of the first search results by the device;
adding the one of the first search results to a plan;
receiving a second search request by the device after receiving the selection; and
displaying second search results on the display of the device in response to receiving the second search request, the second search results being based on the second search request and corresponding to the geographic location of the one of the first search results,
wherein the first search request comprises a first input received by the device via a first input mode and a second input received by the device via a second input mode different than the first input mode,
the first input comprises a spoken query received by a microphone of the device, the spoken query specifying a type of the first search results,
the first search results are displayed on a map on the display of the device in correspondence with the geographic location of each of the first search results, and
the second search results are displayed on the map on the display of the device in correspondence with the geographic location of the one of the first search results.

* * * * *